Sept. 24, 1963 W. T. HEYER ET AL 3,104,861
TIMER VALVE
Filed Feb. 23, 1961
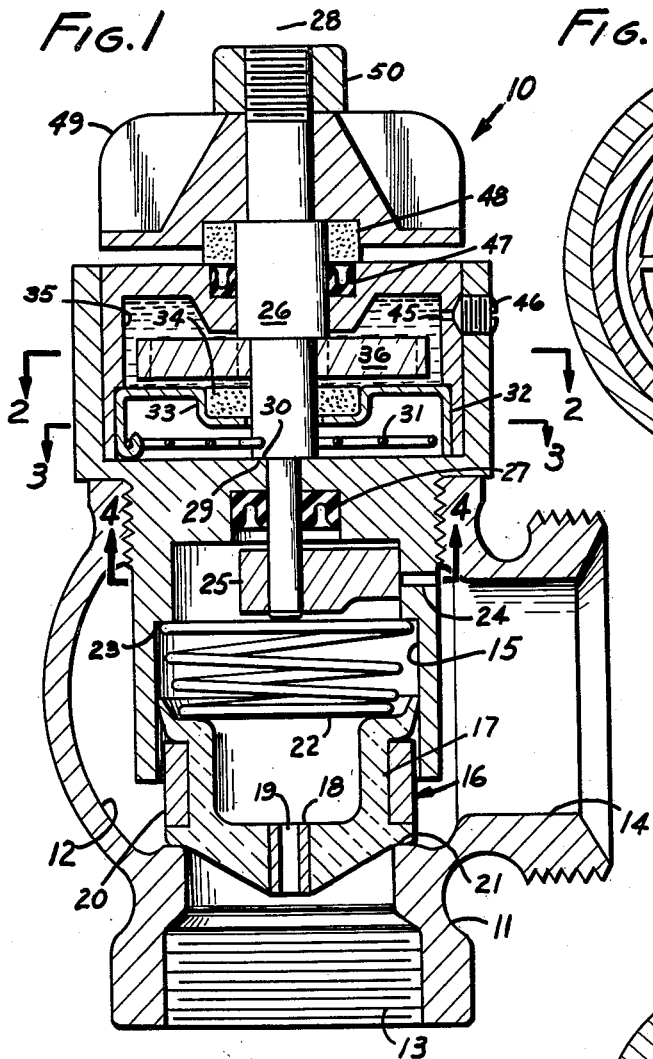
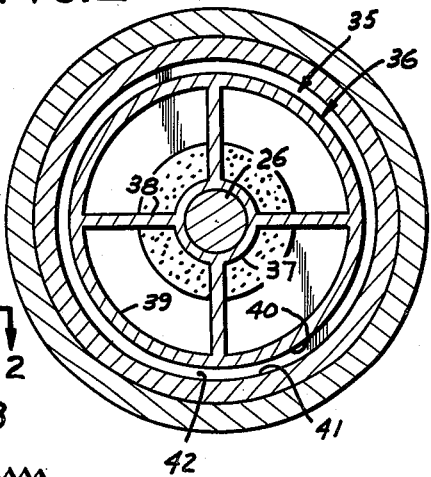
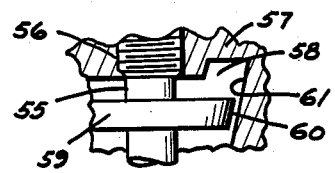
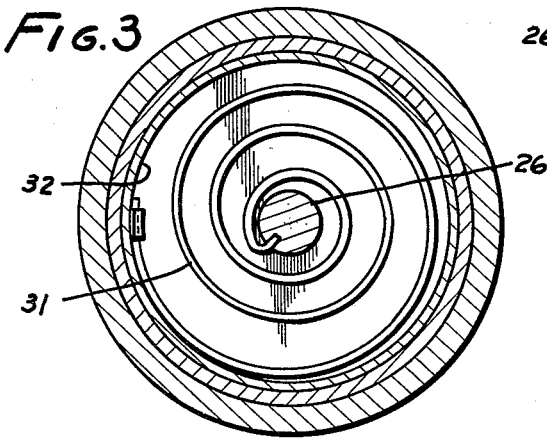
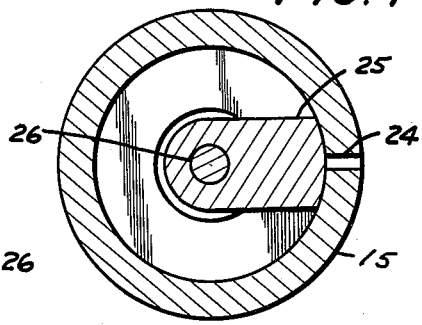
INVENTOR.
WILLIAM T. HEYER
FRANK KEPKA
BY
*Angus & Mon*
ATTORNEYS.

3,104,861
TIMER VALVE
William T. Heyer, 411 N. Wilson, Pasadena, Calif., and
Frank Kepka, 2995 N. Lake Ave., Altadena, Calif.
Filed Feb. 23, 1961, Ser. No. 91,110
7 Claims. (Cl. 251—43)

This invention relates to a timer, which, while it has general utility as such, is principally useful in turning off valves after a predetermined period of time has elapsed.

The object of this invention is to provide a simple timer which is broadly useful as a timer, but which is best adapted to control a valve wherein, with a turn of the handle, the valve is opened, and is thereafter automatically shut after a predetermined period of time elapses.

A related object is to provide a timer and valve combination which is both rugged and, as to the length of the elapsed period, substantially insensitive to variations in temperature.

Still another object is to provide a timer valve in which the flow is full on during substantially the entire period of time the valve is open, and quickly shut off rather than gradually shut down over a considerable period of time, as occurs in conventional valves of this general nature.

A timer valve according to this invention includes a body having a passage with an inlet and an outlet. Shut-off means are provided in the passage for opening and closing it to flow from the inlet to the outlet. A rotary shaft is connected to the shut-off means for operating the same, and timer means are attached to the rotary shaft for determining the time taken by the rotary shaft to move from a first position at which the shut-off means opens the passage to flow to a second position at which the shut-off means closes the passage to flow.

The timer means comprises a chamber having an interior peripheral wall, and a rotatable disc in said chamber mounted to the rotary shaft to turn therewith. The disc has a peripheral surface spaced from the interior wall so as to leave a space therebetween. A silicone or other viscous material fills in this space, being in fluid contact with both the surface and the wall. Rotation of the disc is resisted by shear forces generated in the viscous fluid. A spring biases the rotary shaft toward the second, off, position. Turning the shaft toward the first, open, position opens the passage and stores energy in the spring so that the spring tends to turn the shaft to the second position, this return movement being retarded by the shear forces in the silicone. The time of return (and of the valve's being open) is thereby made at least in part a function of these forces.

According to a preferred but optional feature of the invention, the surface on the disc and the interior wall are both cylindrical and coaxial.

According to still another preferred but optional feature of the invention, the surface on the disc and the interior wall are coaxial and conical, the shaft being axially movable so that at its first position the surface and the wall are closer together than at the second position. The shear forces in the viscous material then are greater when the spring force is greater, which tends to make the speed of rotation more uniform.

According to still another preferred but optional feature of the invention, the shut-off means comprises a pilot valve having a piston adapted to shift to open and close the passage to flow, the position of the piston being determined by whether a bleed port is open or not. This condition of the bleed port is determined by a valve member carried by the rotary shaft.

The above and other features of this invention will be fully understood from the following detailed description and the accompanying drawings in which:

FIG. 1 is a cross-section of the presently preferred embodiment of the invention;

FIGS. 2, 3 and 4 are cross-sections taken at lines 2—2, 3—3, and 4—4, respectively, in FIG. 1; and FIG. 5 is a fragmentary cross-section showing an alternate embodiment of the invention.

In FIG. 1, there is shown a timer valve 10 having a body 11 with a passage 12 therethrough, the passage having an inlet 13 and an outlet 14. The function of the valve is to control fluid flow from the inlet to the outlet. In order to accomplish this control, shut-off means are provided in the passage in the form of a pilot valve which includes a cylinder 15 with a smooth interior bore in which a piston 16 slides. The piston includes a resilient seal member 17 at whose central location there is an eyelet 18 that forms a piston hole 19 which extends from face to face of the piston. The piston hole connects the inside of the cylinder to inlet pressure. The piston is given structural support by a ring 20, the resilient seal member being snapped into it. The seal member is adapted to bear against a seat 21 to shut off flow between the inlet and the outlet. In this application, reference is sometimes made to a first and second position of certain elements. The first position is that which pertains when the seal member is withdrawn from the seat and the valve is open to flow. The second position is as illustrated, where the valve is closed to flow.

A spring 22 is opposed between the piston and a shoulder 23 in the cylinder. The resilient seal member is biased toward the seat by this spring.

Above the piston, the wall of the cylinder is pierced by a bleed port 24 which interconnects the inside of the cylinder with outlet pressure.

A valve member 25, which in the preferred embodiment is a cam, is fitted inside the cylinder so that in the second position of the valve (see FIG. 4) it closes off the bleed port. When the valve member is rotated, the bleed port is opened. The open or closed condition of the bleed port determines whether the valve is opened or closed.

Rotation of the cam member, and thereby the opening and closing of the valve, is accomplished by turning rotary shaft 26. This shaft enters the upper end of the cylinder through a U-cup seal 27. Valve member 25 is mounted to the end of the rotary shaft within the cylinder. The rotary shaft extends upwardly along axis 28 of the device and has a first step 29 seated against a shoulder 30.

It will be noted that only frictional forces hold the rotary shaft against vertical expulsion from the device. However, the area of the rotary shaft which is exposed to fluid under pressure in the cylinder is quite small, and not enough force is generated under ordinary pressures to expel the shaft; therefore, no particular retention means needs to be provided to hold the rotary shaft in place.

A coil spring 31 is keyed to a retainer 32 and to the rotary shaft, tendnig to bias the rotary shaft to the second position illustrated in FIG. 4. The retainer has a cup portion 33 which receives a packing 34. The region around the coil spring is thereby isolated from the surrounding portions of the device.

Above the retainer there is a chamber 35 which surrounds the rotary shaft. Within this chamber there is a rotatable disc 36 mounted to the rotary shaft. The disc and the rotary shaft are coaxial. The disc is best shown in FIG. 2. It has a hub 37, four spokes 38, and a rim 39 with an outer peripheral cylindrical surface 40 thereon. This peripheral surface is spaced from the interior wall 41 of the chamber, the interior wall also being cylindrical and coaxial with the rotary shaft. A space 42 separates surface 40 and interior wall 41. Convenient dimensions are: diameter of surface 40: 1.000 inch; disc thickness: 3/16 inch; radial clearance between surface 40 and wall 41: 0.015–0.020 inch.

Space 42 is filled with a viscous material. The preferred material is a silicone such as Dow-Corning Silicone, 2000 series, or 432 Gum.

Silicones are preferred for their chemical and physical stability. In particular, at ordinary temperatures their viscosity change is negligible with changes in temperature. Because the period determined by the timer is principally a function of the viscosity, this is an important advantage. However, viscous materials, which may be liquid, semiliquid, or semi-solid, other than silicones are also useful, and the term "viscous material" is intended to include all of these, as well as silicones.

Shear forces in the viscous material are developed by relative movement between surfaces on the disc and on the inside surface of the chamber. Therefore, any surface of the disc could be used for this purpose, including the top and bottom. However, the peripheral surface is usually to be preferred, because it is a simple matter to control clearances between two concentric surfaces. It is more difficult to control them between two parallel surfaces. Thus, in relying on the peripheral surface, it is useful, but not necessary, to cut away as much of the other surfaces as possible. This is the reason that the rim is held with spokes, instead of being part of a solid disc. However, the spoked wheel is sometimes referred to as a disc, and a disc will still work well, even though attention must be paid to the question of top and bottom clearance.

A fill port 45, which is sealed by a plug 46, is provided for injecting the viscous material into the chamber. Another U-cup seal 47 surrounds the rotary shaft above the chamber and this, in turn, is closed off by a seal 48 such as a felt washer, which is placed between a handle 49 and the upper surface of the valve body. A nut 50 holds the handle on the rotary shaft.

FIG. 5 illustrates an alternate embodiment of rotatable disc and interior chamber wall. A rotary shaft 55 corresponding to rotary shaft 26 has threads 56 which are threaded into the upper portion of body 57 above chamber 58. Chambers 58 and 35 correspond to each other, and rotatable disc 59 corresponds to disc 36. However, rotatable disc 59 has its outer peripheral surface 60 in the form of the frustum of a cone, and the interior wall 61 of the chamber 58 is also the frustum of a cone. The surface and the wall are coaxial, and their conical angles are equal. Viscous material is placed between them. The threads on shaft 55 are left-hand threads, so that when the rotary shaft is turned counter-clockwise by the handle, the surface and interior wall are brought closer together, thereby diminishing their separation and increasing the shear forces when the spring force tending to restore the rotary shaft to its second position is the greatest.

The operation of the device in FIG. 1 will now be described. With initial reference to the second position illustrated in FIG. 1, it will be seen that inlet pressure is supplied to the inside of the cylinder through piston hole 19. Bleed port 24 is closed by valve member 25. Therefore, the fluid pressure on both sides of the piston are substantially equal, and the force resulting from the differential area plus the bias force of spring 22, move the piston down so that the resilient seal member firmly bears against seat 21 and closes off the passage to fluid flow.

If the rotary shaft is turned counter-clockwise to a first position so as to wind up coil spring 31 and remove the valve member from the bleed hole, pressure within the cylinder is dropped to substantially the outlet pressure. Then there is a net upward force exerted across the piston which tends to move it upward, compressing spring 22 and opening the valve to flow.

When the bleed port is again closed, then pressure rises in the cylinder until the unbalanced force is sufficient to move the piston down to again close off the valve.

It now remains to be shown how the valve member is moved and how the timing of its movement is attained. The valve is preferably opened by turning it counter-clockwise so that coil spring 31 is wound up and exerts a force tending to return the valve member and the rotary shaft to the illustrated second position. This turning of the shaft is accomplished by rotating the handle and, as will be seen, the length of time that it takes to return the rotary shaft to the second position will be determined by two factors: (1) how far the shaft is turned; and, (2) the shear forces within the viscous material. When the shaft is released, the energy stored in the coil spring begins to return the shaft by turning it clockwise. This motion is resisted by shear forces occurring in the silicone between the outer surface of the disc and the interior wall of the chamber. The viscous material thereby determines the period of time it takes for the shaft to return to its second position.

The alternate embodiment of disc shown in FIG. 5 provides means whereby the shear forces in the viscous fluid may be increased at the time the force exerted by the coil spring is the greatest. Turning the rotary shaft counter-clockwise moves the outer peripheral surface of the disc 59 closer to surface 60, thereby increasing the shear forces. As the spring uncoils, the surfaces will move apart, thereby lowering the forces at the time the spring force decreases. This tends to even out the effect of the varying force exerted by the spring and results in a more uniform rate of rotation of the rotary shaft during the entire period.

Because the off-on conditions of the valve are determined solely by the pressure in the cylinder, which is, in turn, determined by the opened or closed condition of the bleed port, it will be seen that the valve does not shut off gradually. Instead, it tends to stay on until the pressure in the cylinder rises to a given value, and then shuts off. So, for the major portion of the period, the valve is full-on. This contrasts with timer valves which are shut off gradually by a valve member which is steadily advanced toward a seat by a screw-threaded stem.

This invention thereby provides a simple and rugged timer valve together with a timer which has substantial additional applications in fields other than the control of an off-on valve.

This invention is not to be limited by the embodiments shown in the drawings and described in the description which are given by way of example and not of limitation, but only in accordance with the scope of the appended claims.

We claim:

1. In a timer valve of the type having a valve body, a valve seat in the body, an inlet opening communicating with the valve seat, an outlet opening, conduit means between the valve seat and the outlet opening, casing means secured to said valve body having a cylinder opposite the valve seat, a piston mounted for reciprocating movement in the cylinder and having a valve element thereon to engage said valve seat, said piston having a passageway therethrough communicating between the inlet opening and the cylinder, and resilient means urging the valve element toward the valve seat, the improvement comprising:

a shaft extending through the casing means in axial alignment with the cylinder, said cylinder having a port in its sidewall communicating between the outlet opening and the interior of the cylinder, a cam in the cylinder mounted on the shaft and extending radially to the cylinder sidewall for covering said sidewall port in a first rotary position and uncovering said port in a second rotary position, a spring in the valve body connected to the shaft and biasing the shaft to rotate the cam toward the first rotary position, said casing means having a closed chamber formed therein opposite said cylinder and coaxial therewith enclosing a portion of the shaft, a disc in the chamber mounted on the shaft, a peripheral surface on the disc spaced from and facing an interior surface of the chamber, and a viscous fluid filling the space between said surfaces, whereby rotation of the shaft in one direction uncovers the port permitting the piston to be displaced off the valve seat and the disc retards movement of the cam toward the port.

2. In a timer valve of the type having a valve body, a valve seat in the body, an inlet opening communicating with the valve seat, an outlet opening, conduit means between the valve seat and the outlet opening, casing means secured to said valve body having a cylinder opposite the valve seat, a piston mounted for reciprocating movement in the cylinder and having a valve element thereon to engage said valve seat, said piston having a passageway therethrough communicating between the inlet opening and the cylinder, and resilient means urging the valve element toward the valve seat, the improvement comprising:

a shaft extending through the casing means in axial alignment with the cylinder, said cylinder having a port in its sidewall communicating between the outlet opening and the interior of the cylinder, a cam in the cylinder mounted on the shaft and extending radially to the cylinder sidewall for covering said sidewall port in a first rotary position and uncovering said port in a second rotary position, a spring in the valve body connected to the shaft and biasing the shaft to rotate the cam toward the first rotary position, said casing means having a closed chamber formed therein opposite said cylinder and coaxial therewith enclosing a portion of the shaft, a circular disc in the chamber mounted on the shaft, the peripheral surface on the disc and the interior wall of the chamber being coaxial and conical, said shaft being threaded in the body, and a viscous fluid filling the space between said peripheral wall and the surface, whereby rotation of the shaft toward the second rotary position moves the disc axially to reduce the separation between the peripheral surfaces thereby increasing resistance to rotation of the cam toward the first rotary position.

3. In a timer valve of the type having a valve body, a valve seat in the body, an inlet opening communicating with the valve seat, an outlet opening, conduit means between the valve seat and the outlet opening, casing means secured to said valve body having a cylinder opposite the valve seat, a piston mounted for reciprocating movement in the cylinder and having a valve element thereon to engage said valve seat, said piston having a passageway therethrough communicating between the valve seat and the cylinder, and resilient means urging the valve element toward the valve seat, the improvement comprising:

a shaft extending through the casing means in axial alignment with the cylinder, said cylinder having a port in its sidewall communicating between the outlet opening and the interior of the cylinder, a cam in the cylinder mounted on the shaft and extending radially to the cylinder sidewall for covering said sidewall port in a first rotary position and uncovering said port in a second rotary position, a spring in the valve body connected to the shaft and biasing the shaft to rotate the cam toward the first rotary position, said casing means having a closed chamber formed therein opposite said cylinder and coaxial therewith enclosing a portion of the shaft, a circular disc in the chamber mounted on the shaft, said disc being in the form of an annular ring supported by spokes, a peripheral surface of the ring being spaced from and facing the interior surface of the chamber, and a viscous fluid filling the space between said surfaces, whereby rotation of the shaft in one direction uncovers the port permitting the piston to be displaced off the valve seat and the disc retards movement of the cam toward the port.

4. In a timer valve of the type having a valve body, a valve seat in the body, an inlet opening communicating with the valve seat, an outlet opening, conduit means between the valve seat and the outlet opening, casing means secured to said valve body having a cylinder opposite the valve seat, a piston mounted for reciprocating movement in the cylinder and having a valve element thereon to engage said valve seat, said piston having a passageway therethrough communicating between the valve seat and the cylinder, and resilient means urging the valve element toward the valve seat, the improvement comprising:

a shaft extending through the casing means in axial alignment with the cylinder, said cylinder having a port in its sidewall communicating between the outlet opening and the interior of the cylinder, a cam in the cylinder mounted on the shaft and extending radially to the cylinder sidewall for covering said sidewall port in a first rotary position and uncovering said port in a second rotary position.

a spring in the valve body connected to the shaft and biasing the shaft to rotate the cam in one direction toward the first rotary position, said casing means having a closed chamber formed therein opposite said cylinder and coaxial therewith enclosing a portion of the shaft, a circular disc in the chamber mounted on the shaft, the peripheral surface on the disc and the interior wall of the chamber being coaxial and conical, said shaft being threaded in the body in the direction opposite of said spring biasing to move the disc axially thereby reducing the separation between the peripheral surfaces, whereby rotation of the shaft toward the second position permits the valve to open until the cam returns to the first rotary position.

5. A timer comprising: a base, rotary shaft, a chamber having an interior wall, a rotatable disc in the chamber mounted on the rotary shaft, said disc having a peripheral surface spaced from the interior wall, said peripheral surface and said wall being coaxial and conical, said shaft having means thereon for displacing the shaft axially in the direction of reducing the separation between the peripheral surface and said wall upon rotation of the shaft in one direction, a viscous fluid in the space between the surface and the wall and in fluid contact therewith, and means biasing the shaft in the opposite direction whereby the disc provides resistance to rotation in proportion to the angular displacement of the shaft in said one direction.

6. A timer comprising: a base, a rotary shaft, a chamber having an interior wall, a rotatable disc in the chamber mounted on the rotary shaft, said disc having a peripheral surface spaced from the interior wall, said peripheral surface and said wall being coaxial and conical, said shaft being threadedly mounted in the base for axial movement of the shaft and disc relative to the wall, a viscous fluid in the space between the surface and the wall and in fluid contact therewith, and means biasing the shaft in one direction of rotation, said threaded mounting upon rotation of said shaft in the opposite direction axially moving the shaft and the disc to reduce the separation between the surface and the wall whereby the resistance to rotation of the disc increases with angular displacement of the shaft in said opposite direction.

7. A timer according to claim 5 in which the viscous fluid is silicone.

References Cited in the file of this patent

UNITED STATES PATENTS

| | | |
|---|---|---|
| 1,172,421 | Beck | Feb. 22, 1916 |
| 1,273,140 | Brooks | July 23, 1918 |
| 1,962,367 | Smythe | June 12, 1934 |
| 1,969,755 | Kellogg | Aug. 14, 1934 |
| 2,080,279 | Kellogg | May 11, 1937 |
| 2,705,631 | Reichold | Apr. 5, 1955 |